(12) United States Patent
Potter

(10) Patent No.: US 11,287,100 B2
(45) Date of Patent: Mar. 29, 2022

(54) LIGHT SYSTEM INCLUDING A STATIC BENDING LIGHT

(71) Applicant: Valeo Vision SAS, Bobigny (FR)

(72) Inventor: Brant Potter, Seymour, IN (US)

(73) Assignee: Valeo Vision SAS, Bobigny (FR)

( * ) Notice: Subject to any disclaimer, the term of this patent is extended or adjusted under 35 U.S.C. 154(b) by 0 days.

(21) Appl. No.: 17/006,053

(22) Filed: Aug. 28, 2020

(65) Prior Publication Data
US 2022/0065419 A1 Mar. 3, 2022

(51) Int. Cl.
*F21S 41/36* (2018.01)
*F21S 41/26* (2018.01)
*F21S 41/265* (2018.01)
*F21S 41/27* (2018.01)

(52) U.S. Cl.
CPC .............. *F21S 41/36* (2018.01); *F21S 41/26* (2018.01); *F21S 41/265* (2018.01); *F21S 41/27* (2018.01)

(58) Field of Classification Search
CPC ...... B60Q 1/0041; B60Q 1/18; B60Q 1/0047; B60Q 1/16; F21S 41/36; F21S 41/151; F21S 41/153; F21S 41/141; F21S 41/26; F21S 41/67; F21S 41/675
See application file for complete search history.

(56) References Cited

U.S. PATENT DOCUMENTS

| | | | | |
|---|---|---|---|---|
| 8,080,942 B2 * | 12/2011 | Heider | ..................... | B60Q 1/12 315/77 |
| 2001/0012206 A1 * | 8/2001 | Hayami | ................... | B60Q 1/12 362/464 |
| 2002/0015308 A1 * | 2/2002 | Naganawa | ............... | B60Q 1/12 362/464 |
| 2003/0031008 A1 * | 2/2003 | Kobayashi | ............. | B60Q 1/085 362/37 |
| 2003/0067762 A1 * | 4/2003 | Fukawa | ................ | F21S 41/657 362/37 |
| 2003/0067763 A1 * | 4/2003 | Fukawa | ................... | B60Q 1/18 362/40 |
| 2003/0067780 A1 * | 4/2003 | Fukawa | ................... | B60Q 1/18 362/466 |

(Continued)

FOREIGN PATENT DOCUMENTS

| | | | | |
|---|---|---|---|---|
| DE | 19843817 A1 * | 4/2000 | ........... | B60Q 1/0041 |
| DE | 19923187 A1 * | 11/2000 | ............... | B60Q 1/18 |

(Continued)

OTHER PUBLICATIONS

Machine translation of DE 19843817, Espacenet. (Year: 2021).*
International Search Report for Application No. PCT/US2021/046426, dated Dec. 23, 2021.

*Primary Examiner* — Alexander K Garlen
*Assistant Examiner* — Colin J Cattanach
(74) *Attorney, Agent, or Firm* — Young Basile Hanlon & MacFarlane, P.C.

(57) ABSTRACT

A light system comprising: (a) a plurality of light sources configured to be located on a vehicle and project light outboard of a width of a vehicle; (b) one or more reflectors that are angled in a first direction relative to the plurality of light sources; and (c) one or more static bending light reflectors that are angled in a second direction relative to the plurality of light sources and the one or more reflectors.

20 Claims, 5 Drawing Sheets

(56) References Cited

U.S. PATENT DOCUMENTS

| | | | |
|---|---|---|---|
| 2004/0165373 A1* | 8/2004 | Reismiller | B60Q 1/18 362/36 |
| 2005/0047153 A1 | 3/2005 | Ravier | |
| 2005/0094411 A1* | 5/2005 | Ishida | B60Q 1/0041 362/538 |
| 2005/0094413 A1* | 5/2005 | Sazuka | F21S 41/155 362/544 |
| 2005/0201111 A1* | 9/2005 | Fukawa | B60Q 1/18 362/464 |
| 2005/0219856 A1* | 10/2005 | Tatsukawa | F21S 41/323 362/507 |
| 2006/0209556 A1* | 9/2006 | Tajima | B60Q 1/12 362/516 |
| 2008/0151567 A1 | 6/2008 | Albou | |
| 2009/0284981 A1* | 11/2009 | Iwasaki | F21S 41/365 362/518 |
| 2010/0232173 A1* | 9/2010 | Ohno | F21S 41/151 362/538 |
| 2014/0198517 A1* | 7/2014 | Yamamoto | F21S 41/148 362/543 |
| 2015/0042224 A1* | 2/2015 | Stout | B60Q 1/10 315/82 |
| 2015/0070924 A1* | 3/2015 | Kadowaki | F21S 41/151 362/517 |
| 2016/0368411 A1* | 12/2016 | Jackson | B60Q 1/04 |
| 2017/0114974 A1* | 4/2017 | Nishimura | F21S 41/322 |
| 2017/0261171 A1* | 9/2017 | Yamamoto | F21S 41/36 |
| 2017/0292668 A1* | 10/2017 | Arai | F21S 45/47 |
| 2017/0336042 A1* | 11/2017 | Laminette | F21S 41/285 |
| 2018/0180240 A1* | 6/2018 | Shon | B60Q 1/0041 |
| 2019/0359118 A1* | 11/2019 | Spenner | F21S 41/285 |
| 2021/0088196 A1* | 3/2021 | Mun | F21S 41/141 |

FOREIGN PATENT DOCUMENTS

| | | | | |
|---|---|---|---|---|
| DE | 202004010950 U1 | 3/2005 | | |
| DE | 202017001946 U1 | 5/2017 | | |
| EP | 1659028 A1 * | 5/2006 | | B60Q 1/12 |
| EP | 3285001 A1 | 2/2018 | | |
| FR | 2933921 A1 * | 1/2010 | | B60Q 1/20 |
| JP | 2006172829 A * | 6/2006 | | |
| JP | 2014127329 A * | 7/2014 | | F21S 41/265 |
| KR | 20140055362 A | 5/2014 | | |
| KR | 20160012464 A | 2/2016 | | |

\* cited by examiner

LIGHT SYSTEM INCLUDING A STATIC BENDING LIGHT

FIELD

The present teachings relate to a light system including a static bending light that provides light laterally our in an outward direction away from a vehicle.

BACKGROUND

Headlights in vehicles typically are static in position and once aimed maintain the aim. In order to illuminate a larger area the headlights are switched from a low beam to a high beam. In order to illuminate a predetermined field size the light extends out of the vehicle at a pre-determined angle through a predetermined aperture size. Typically, the light system provides light to a predetermined region outside of a vehicle.

Examples of light systems may be disclosed in Korean Publication No. KR20160012464 and KR20140055362 all of which are expressly incorporated herein by reference for all purposes. Thus, there is a need for a light system where the light source extends substantially sideways from a vehicle. There is a need for a light system that provides light to a region without the exit opening size changing or changing a packing space of the light system. It would be desirable to have a light system where the lights extending from a vehicle to cover an area 50 degrees or more or 65 degrees or more from the vehicle.

SUMMARY

The present teachings provide: a light system comprising: (a) a plurality of light sources configured to be located on a vehicle and one or more of the plurality of light sources configured to generate light that is projected outboard of a width of a vehicle; (b) one or more reflectors that are angled in a first direction relative to the plurality of light sources; and (c) one or more static bending light reflectors that are angled in a second direction relative to the plurality of light sources and the one or more reflectors so that light from the one or more static bending light reflectors are projected outboard of the width of the vehicle.

The present teachings provide: s light system comprising: (a) a primary lens within a vehicle; (b) a plurality of light sources configured to be located on the vehicle and one or more of the plurality of light sources configured to generate light that is projected outboard of a width of a vehicle; (c) one or more reflectors that are angled in a first direction relative to the plurality of light sources so that light extends from the one or more light reflectors through the primary lens in a reflected direction region; and (d) one or more static bending light reflectors that are angled in a second direction relative to the plurality of light sources and the one or more reflectors so that light is reflected through the primary lens in a static bending light direction region that different from the reflected direction region.

The present teachings provide a light system where the light source extends substantially sideways from a vehicle. The present teachings provide a light system that provides light to a region without the exit opening size changing or changing a packing space of the light system. The present teachings provide a light system where the lights extending from a vehicle to cover an area 50 degrees or more or 65 degrees or more from the vehicle.

BRIEF DESCRIPTION OF THE DRAWINGS

FIG. 4B is an isocandela illustrating the light pattern formed by the light system with the static bending light turned on.

DETAILED DESCRIPTION

Figure 1:
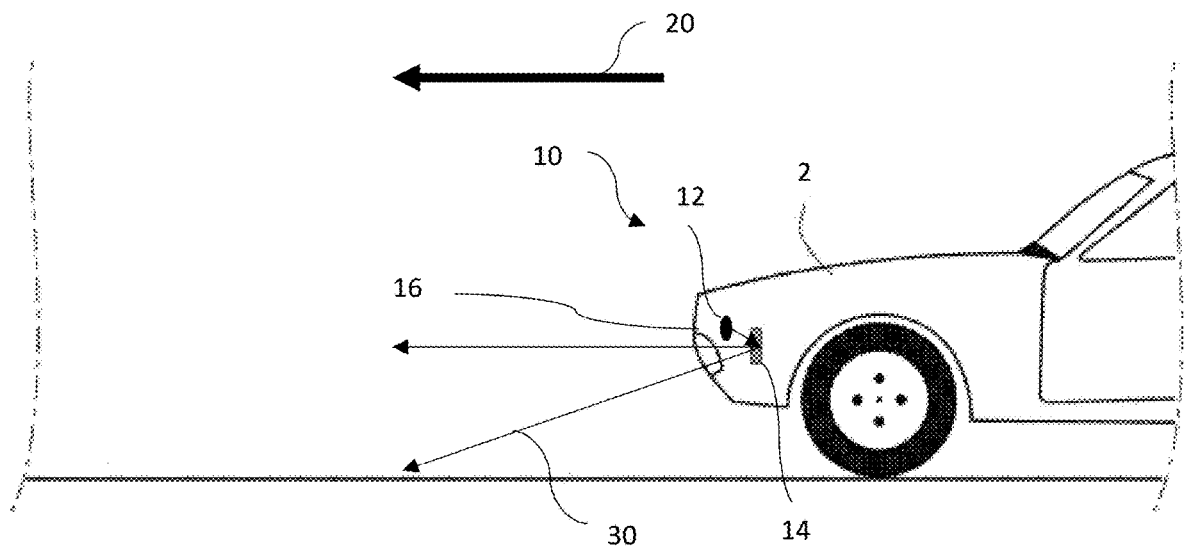
FIG. 1 is a top view of a vehicle including the light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a car, motorcycle, bus, truck, semi-truck, SUV, XUV, four-wheeler, dirt bike, boat, commercial vehicle, construction vehicle, industrial vehicle, farm equipment, plane, helicopter, or a combination thereof. The vehicle includes a longitudinal axis that extend through the vehicle in a direction of movement. The longitudinal axis may be a vertical axis or a in a direction of movement (i.e., forward or backward). The longitudinal axis, vertical axis, or both may have a horizontal axis that extends therethrough in a perpendicular direction to the longitudinal axis, vertical axis, or both. The light system may project light along the longitudinal axis or vertical axis and some light along the horizontal axis. The light system may project in a forward direction, rear direction, side direction, or a combination thereof. Preferably, the light system projects a light from an external surface of the vehicle to a location in front of the vehicle or in a direction of movement. The light system may be integrated into a front end, a rear end, or both of a vehicle. The light system may project light out of the vehicle. The light source may include lights and optical elements, reflectors, lenses, or a combination thereof. The light system may include a plurality of light sources. The lights of the light system may be part of a light source.

The light source functions to produce light. The one or more light sources may be located within a vehicle. The light sources may be part of a light system. The light sources may project light outboard of a width of a vehicle. For example, if a vehicle is 6 feet wide then the light source (e.g., static bending light) is configured to project light outside of the 6 feet width of the vehicle. The light source may be a device or plurality of devices that create light and the light extends outward from the light source. The light source may produce a high beam, a low beam, or both. The light source may be aimed for near field or far field. The light source may be any type of lighting device or light that produces light such as an incandescent bulb, fluorescent light, compact fluorescent lamp, halogen lamp, light emitting diode (LED), laser diode, high intensity discharge lamps (HID); halogen lights, xenon lights, or a combination thereof. The light source may be a single lamp or bulb. Preferably, the light source includes a plurality of lamps, bulbs, diodes, or a combination thereof. The light source may be an array. The light source may include two or more, 5 or more, 10 or more, 20 or more, or even 50 or more devices that produce light and combine together to form the light source. The light source may include 10,000 or less, 7,500 or less, or 5,000 or less devices that produce light. For example, if the light source is a 10×10 array of light devices some of the 100 devices may be selectively turned on and off, dimmed, brightened, or a combination thereof. The light source may be a single light. The light source may be a plurality of lights. There may be a plurality of light sources. The light source may be static. The light source may be free of movement. The light source may be fixed. The light source may be fixed and the light from the light source may be moved, bent, directed, aimed, or a combination thereof by optical elements, lenses, reflectors, collimators, or a combination thereof. The light from the light source may be moved or aimed from near field to far field or vice versa. Each device of the light source may be turned on an off. The color, intensity, shape, or a combination thereof of each device of the light source may be controlled or adjusted. For example, some devices may be turned red and other devices may remain white. The light source may direct light to a driving surface. For example, a center of the light may be located on the driving surface. The light source may direct light above a driving surface (e.g., some light may contact and illuminate the driving surface by a center of the light may be located above the driving surface). The light source may be directed substantially parallel to the light surface. For example, a center of the light, an axis of the light (e.g., optical axis), or both may extend parallel to the driving surface. The light source may extend along an axis or may be directed away from the axis. The light from the light source may extend in a direction of movement of a vehicle, along a vertical axis, optical axis, or a longitudinal axis of a vehicle. The light from the light source may project light (e.g., direct light) in a forward direction. Preferably, the light from the light source projects light (e.g., direct light) into a reflector and the reflector directs the light outward from a vehicle. Direct light may be directed into a reflector and indirect light may be used to illuminate an area around a vehicle. The indirect light as discussed herein may be reflected light or reflected bending light. The light from the light source may be directed into a reflector and then the reflector may reflect the light in a direction or a direction region (e.g., reflected light or reflected bending light).

The reflector functions to reflect light in a direction of interest. The light may extend in a direction from a light source (light direction (e.g., a first direction)) contact a reflector and then be reflected in a reflected direction, reflected bending light direction (e.g., a second direction). The one or more reflectors may be angled in a first direction relative to the light sources. The one or more reflectors (e.g., primary reflectors) may direct the light in a first direction through the primary lens. The reflectors may be a plurality of reflectors that are angled relative to a plurality of light sources. The reflectors are a plurality of reflectors that may be located substantially side by side. Some or all of the reflectors may be located side by side. Some of the reflectors may be located side by side and a primary reflector axis may extend along an end of the reflectors. The reflectors (e.g., primary reflectors) may extend substantially parallel to the longitudinal axis of the one or more primary lenses. The primary reflector axis of the reflectors and the longitudinal axis of the primary lens may extend parallel to each other. The reflector may reflect the light in a region. The regions may be an area on each side of a light axis. Thus, for example, a light region may have about 30 degrees or more, about 45 degrees or more, about 60 degrees or more, or about 75 degrees or less on all sides of the light axis (e.g., forming an angular cone around the light axis). The reflected light may enlighten an area or region. The reflected light may extend at an angle out of the reflector or illuminate an area within an angle. The reflector may reflect light so that an area of about 5 degrees or more, about 10 degrees or more, about 15 degrees or more, or about 20 degrees or more is illuminated. The reflector may reflect light so that an area of about 45 degrees or less, about 30 degrees or less, or about 25 degrees or less is illuminated. The reflector may be made of a polymer and a metal. The reflector may include a polycarbonate covered with aluminum. The reflector may have a conical shape, a parabolic shape, be curved, convex, concave, or a combination thereof. The light system may include a plurality of reflectors. The reflectors include an end and an opening. The end, the opening, or both may be substantially coplanar or located along an axis (i.e., the ends of the reflectors may located within about ±5 mm or less from the axis or plane). The plurality of reflectors may be co-planar or have openings that are all co-planar. The ends or opening may be staggered. The ends or openings may extend along a curve. A first reflector and a last reflector of the plurality of reflectors (e.g., primary reflectors) may be located on an axis or plane and the other reflectors may curve away from the plane or axis and then back towards the plane or axis as the reflectors extend form the first to the last reflector. All of the reflectors except for the static bending light reflectors may be co-planar, extend in a substantially same direction, or both. The reflectors may include reflectors (e.g., primary reflectors) that provide reflected light and reflectors that provide static bending light (e.g., static bending light reflectors).

The primary reflectors function to provide light (e.g., indirect light) that illuminates a region in a direction of travel of a vehicle. The primary reflectors may provide light into a region in front of a vehicle. The primary reflectors may reflect light in a vertical axis, along a longitudinal axis of a vehicle, along an optical axis, or a combination thereof. The primary reflectors may provide light at an angle that in the direction of the vertical axis, the longitudinal axis, optical axis, or a combination thereof of about ±40 degrees or less, about ±35 degrees or less, or about ±30 degrees or less (i.e., about ±3 degrees). For example, one set of primary reflectors may provide light on a first side of the vertical axis or longitudinal axis (i.e., negative side) and a second set of primary reflectors may provide light on a second side of the vertical axis or longitudinal axis (i.e., positive side). The primary reflectors may reflect the light generally vertically or longitudinally. The primary reflectors may illuminate a width of a two lane road. The primary reflectors may provide light to a region and at least partially overlap light provided by static bending light reflectors. The primary reflectors and the static bending light reflectors may be located within a same cavity of a vehicle.

The one or more static bending light reflectors (SBLR) function to provide light outward away from a vehicle; outward from a vertical axis, a longitudinal axis; or both. The SBLR partially overlaps the reflected light from the primary reflectors and then extends further outward from a vertical axis or a longitudinal axis. The SBLR may be a single SBLR. The SBLR may be a plurality of SBLRs. The SBLR may be angled in a second direction relative to the primary reflectors. The second direction may be different than the first direction. The SBLR may be angled in a second direction relative to one or more light sources, one of the one or more light sources, the one or more primary reflectors, or a combination thereof. The second direction may extend through a primary lens. For example, an entire area of the light extending from the SBLR may extend through the primary lens. The second direction may be a static bending light direction region. The first direction and the second direction may overlap or have a partial overlap (e.g., the reflected direction region and the static bending light direction region may overlap or have a partial overlap). The SBLR is located in a different plane or different line than the primary reflectors. The SBLR may be located at a different angle or a different position relative to the primary reflectors. A forward surface of the SBLR may be located on an axis (e.g., a static bending light reflector axis) at an angle from a line or plane (e.g., a primary reflector axis) extending along a forward surface of the primary reflectors. The SBLR may have an opening or end that is located at an angle relative to the plurality of reflectors (e.g., primary reflectors). The angle between the static bending light reflector axis and the primary reflector axis may be sufficiently large so that light from the SBLR extends outward from the longitudinal axis, vertical axis, or both. The angle between the SBLR and the primary reflector axis may extend at an angle of about 40 degrees or more and about 75 degrees or less. The angle between the static bending light reflector axis and the primary reflector axis may be about 5 degree or more, about 7 degrees or more, about 10 degrees or more, or about 12 degrees or more. The angle between the static bending light reflector axis and the primary reflector axis may be about 30 degrees or less, about 25 degrees or less, about 20 degrees or less, or about 15 degrees or less (i.e., ±2 degrees). The light from the SBLR and the primary reflector may be reflected through one or more primary lenses.

The one or more primary lenses function to direct the light from the reflectors to a location to be illuminated. The primary lenses may bend light. The primary lenses may refract light. The primary lenses may diffuse the light, blend the light, spread the light, direct the light to a predetermined location, create one or more hot spots, or a combination thereof. The primary lens may be located in front of the reflectors, the light sources, or both. The one or more primary lenses may be located inside of an external lens. The primary lenses may cover all or a portion of the light system, the light source, the reflectors, or a combination thereof. The primary lens may cover the reflectors so that light, primary light, reflected light, reflected bending light, or a combination thereof extends through the primary lens. The primary lens may be one or more lenses. The primary lens may be a plurality of primary lenses. The primary lens may be a single lens. The primary lens includes a longitudinal axis. The longitudinal axis may be along a longest dimension of the primary lens (e.g., a length). The primary lens may extend parallel to the longitudinal axis. Preferably, the longitudinal axis is parallel to the ground and the primary lens extends at an angle relative to the longitudinal axis. The longitudinal axis of the primary lens may extend parallel to the primary reflector axis. The primary lens may extend at an angle of about 5 degrees or more, about 10 degrees or more, or about 15 degrees or more (e.g., ±1 degree) relative to the longitudinal axis. The primary lens may extend at an angle of about 30 degrees or less, about 25 degrees or less, or about 20 degrees or less relative to the longitudinal axis. The primary lens may be a single light that receives light from the primary reflectors and the SBLR. The primary lens may be a single light that distributes all of the light from the primary reflectors (e.g., reflected light) and the SBLR (e.g., static bending light).

The reflected light functions to illuminate a driving surface; an area in a direction of movement; identify objects, animals, vehicles, or people in a direction of movement; or a combination thereof. The reflected light may illuminate a reflected direction region (RDR). The RDR may be located on a first side, a second side, or both sides of a longitudinal axis or vertical axis of a vehicle or relative to a vehicle. The reflected light may be an indirect light. The reflected light may not directly extend from a light source to a region or area. The reflected light may be reflected by a reflector in a RDR. The RDR may be an area that the light is spread across to illuminate. The RDR may illuminate an area that is about 5 degrees or more, about 10 degrees or more, about 15 degrees or more, or about 20 degrees or more (i.e., ±3 degrees) from the longitudinal axis or vertical axis. The RDR may illuminate an area that is about 50 degrees or less, about 40 degrees or less, about 35 degrees or less, or about 30 degrees or less. The RDR may extend from a vertical axis or longitudinal axis of a vehicle to about 40 degrees or less from the longitudinal axis. The RDR may include a portion that extends normal through the one or more primary lenses, perpendicular to the one or more primary lenses, or both. The RDR may have light that extends through the one or more primary lenses at an angle. The RDR may extend through the one or more primary lenses at an angle of about 45 degrees or more, about 50 degrees or more, about 55 degrees or more, about 60 degrees or more, or about 65 degrees or more relative to a plane of the primary lens. The RDR may extend through the one or more primary lenses at an angle of about 90 degrees or less, about 85 degrees or less, about 80 degrees or less, or about 75 degrees or less relative to a plane of the primary lens. The RDR may partially overlap reflected bending light within the RDR.

The static bending light functions to provide light to a static bending light reflector. The static bending light may be identical to the other light sources. The static bending light may be a light source and a static bending light reflector. The static bending light may be separate from the primary lights and may provide light in a different direction or region than the primary lights. The static bending light (e.g., static bending light reflector) has an end (e.g., forward end) that is located out of a plane of the one or more reflectors (e.g., the static bending light reflector axis is out of plane or line with the primary reflector axis). The static bending light may be aimed to generate the reflected bending light. The static bending light may provide direct light to the static bending light reflector and then the reflected bending light may be reflected in a static bending light direction region.

The reflected bending light functions to illuminate a region around a car. The reflected bending light functions to illuminate a region on an outside of a vehicle, outside of a center of the vehicle, outside of a width of a vehicle, along a horizontal axis, away from a vertical axis or longitudinal axis, or a combination thereof. The region outside of the width of the vehicle extends from about 30 degrees to about 80 degrees, about 35 degrees to about 75 degrees, or about 40 degrees to about 70 degrees from a longitudinal axis or vertical axis of a vehicle. The regions may be an area on each side of a light axis. Thus, for example, a light region may have about 30 degrees or more, about 45 degrees or more, about 60 degrees or more, or about 75 degrees or less on all sides of the light axis (e.g., forming an angular cone around the light axis). The reflected bending light and the reflected light may overlap. The RDR and the static bending light direction region may partially overlap.

The static bending light direction region (SBLDR) functions to illuminate a region outward of a center of the vehicle, outward of the RDR, or both. The SBLDR may be a peripheral region. The static bending light may illuminate a mid-peripheral region and a far-peripheral region. The mid-peripheral region and the far-peripheral region may be defined by the angles set forth herein. Preferably, the mid-peripheral region and the far-peripheral region are located at least 30 degrees from a vertical axis or a longitudinal axis. The SBLDR extends at an angle relative to and different from the RDR. The SBLDR may be an angle of about 30 degrees or more, about 35 degrees or more, about 40 degrees or more, about 45 degrees or more, or about 50 degrees or more relative to a longitudinal axis, a vertical axis, or both. The SBLDR may be an angle of about 95 degrees or less, about 90 degrees or less, about 85 degrees or less, about 80 degrees or less, about 75 degrees or less, or about 70 degrees or less relative to the longitudinal axis, a vertical axis, or both. The regions may be an area on each side of a light axis. Thus, for example, a light region may have about 30 degrees or more, about 45 degrees or more, about 60 degrees or more, or about 75 degrees or less on all sides of the light axis (e.g., forming an angular cone around the light axis). The SBLDR may extend through the primary lens at an angle. The SBLDR may extend through the primary lens at an angle of about 10 degrees or more, about 15 degrees or more, about 20 degrees or more, about 25 degrees or more, or about 30 degrees or more relative to a plane of the primary lens. The SBLDR may extend through the primary lens at an angle of about 75 degrees or less, about 70 degrees or less, about 65 degrees or less, or about 55 degrees or less relative to the plane of the primary lens (e.g., ±1 degree). The light extending outward from a vehicle functions to illuminate a region around a vehicle so that as the vehicle travels the user may avoid obstacles, items in a path of the vehicle, or around a vehicle.

The light functions to illuminate regions around a vehicle. The light illuminates the regions with a light intensity. The light intensity varies as a distance from a vehicle changes, as a location relative to the vehicle changes, or both. The light intensity may be greatest at a location directly in front of a vehicle. The light intensity at a region about 70 degrees or more or about 75 degrees from a longitudinal axis may have a lowest light intensity. Preferably, a light intensity in a region at about 70 degrees or more or about 75 degrees from the longitudinal axis or vertical axis of the vehicle may be about 50 lm or more, about 100 lm or more, about 150 lm or more, about 200 lm or more, about 250 lm or more, or about 300 lm or more. The light intensity may in a region at about 70 degrees from the longitudinal axis or vertical axis of the vehicle may be about 2000 lm or less, about 1000 lm or less, or about 500 lm or less.

FIG. 1 illustrates a side view of a vehicle 2 including a light system 10. The light system 10 includes a light source 12 and reflectors 14 that project light through a primary lens 16 in front of the vehicle 2 so that items are illuminated by light 30 as the vehicle moves in the direction 20.

Figure 2:
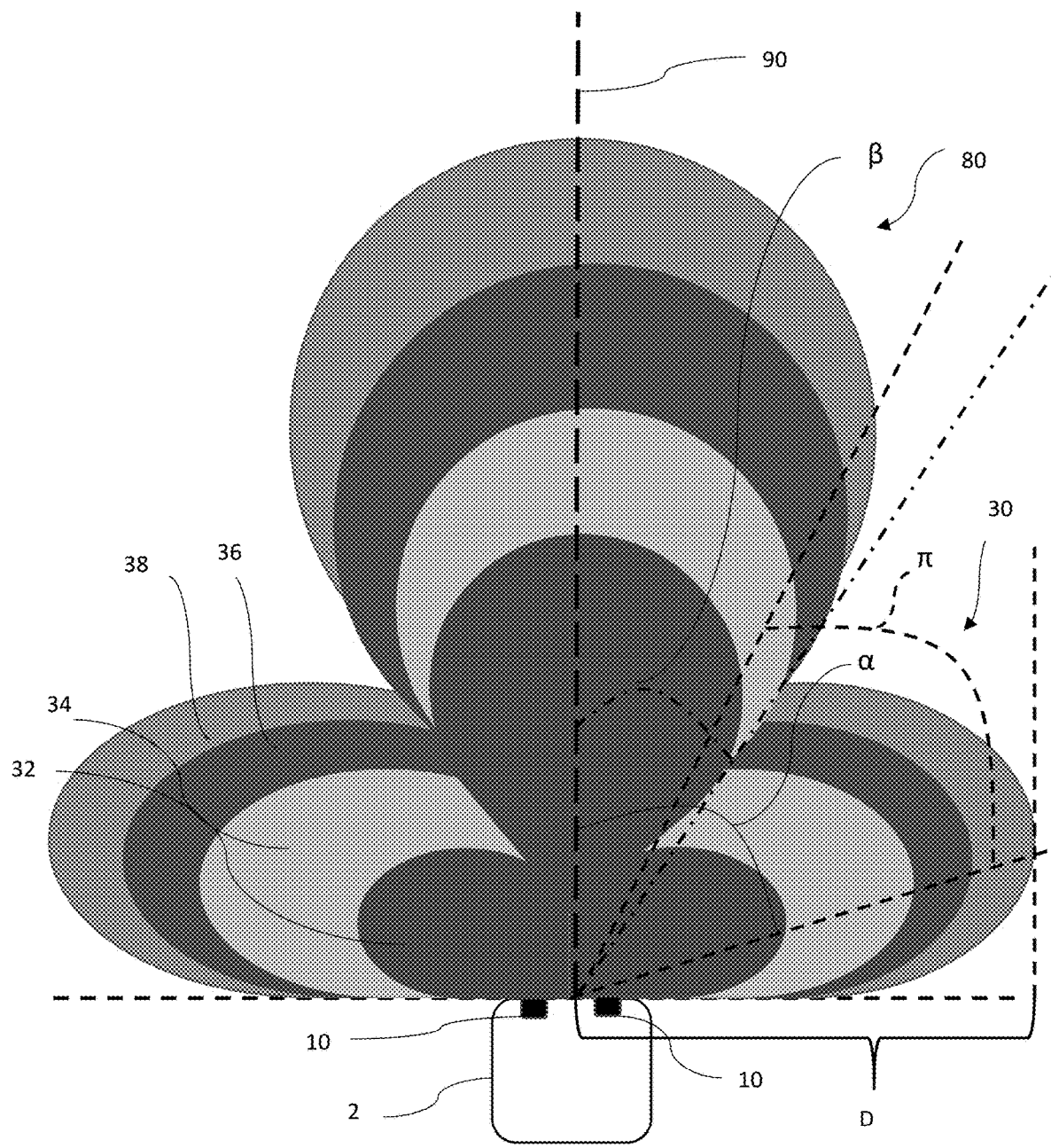
FIG. 2 is a top view of a vehicle and the light projected from the vehicle.

FIG. 2 is a top view of a vehicle 2 and the light patterns formed by each of the light systems 10. The farthest that the light 30 projects outward (or sideways) is a distance (D) from the vehicle 2 at an angle (α) from a longitudinal axis 90 of the vehicle 2 The light 30 has light densities that gradually increase as the light 30 is measured farther and farther from the vehicle 2. The light 30 has the greatest light intensity 32 closest to the vehicle 2, with second closest light intensity 34 being less, with a third light intensity 36 being less than the first and second light intensities 32, 34, and a fourth light intensity 38 being the lowest light intensity. The light 30 has a reflected direction region 80 that extends at an angle (β) from the longitudinal axis 90. The light 30 also includes a static bending light direction region 82 that has an angle (π) and has an outside edge that extends the angle (α) from the longitudinal axis 90.

Figure 3A:
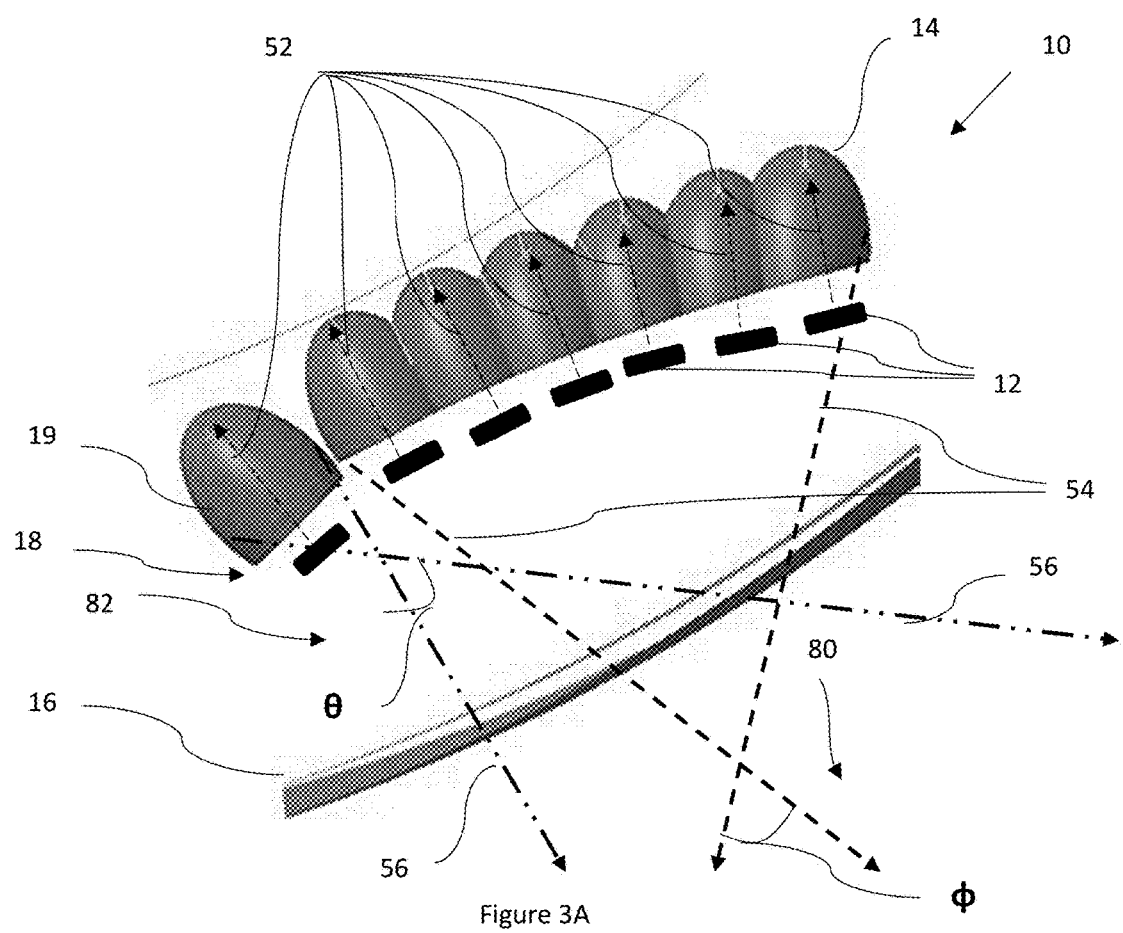
FIG. 3A illustrates the light system including light sources and a static bending light.

FIG. 3A is a top view of the light system 10. The light sources 12 create light that is a direct light 52 which is directed to the reflectors 14 and static bending light reflector 19. The reflectors 14 reflect the light (reflected light 54) through the primary lens 16 to illuminate an area of interest. The reflectors 14 direct light through the primary lens 16 is a first direction region (i.e., a reflected direction region 80). The reflected direction region 80 has light extending within an angle (φ). As shown, one of the reflectors is a static bending light reflector 19 that angles reflected light 54 in a direction to a side of the light system 10. The reflected bending light 56 from the static bending light 18 extends in a static bending light direction region 82 within an angle (θ). The light within the angle (φ) and the angle (θ) have some overlap so that the light is blended together but the reflected bending light 56 extends outward at a larger angle than the reflected light 54.

Figure 3B:
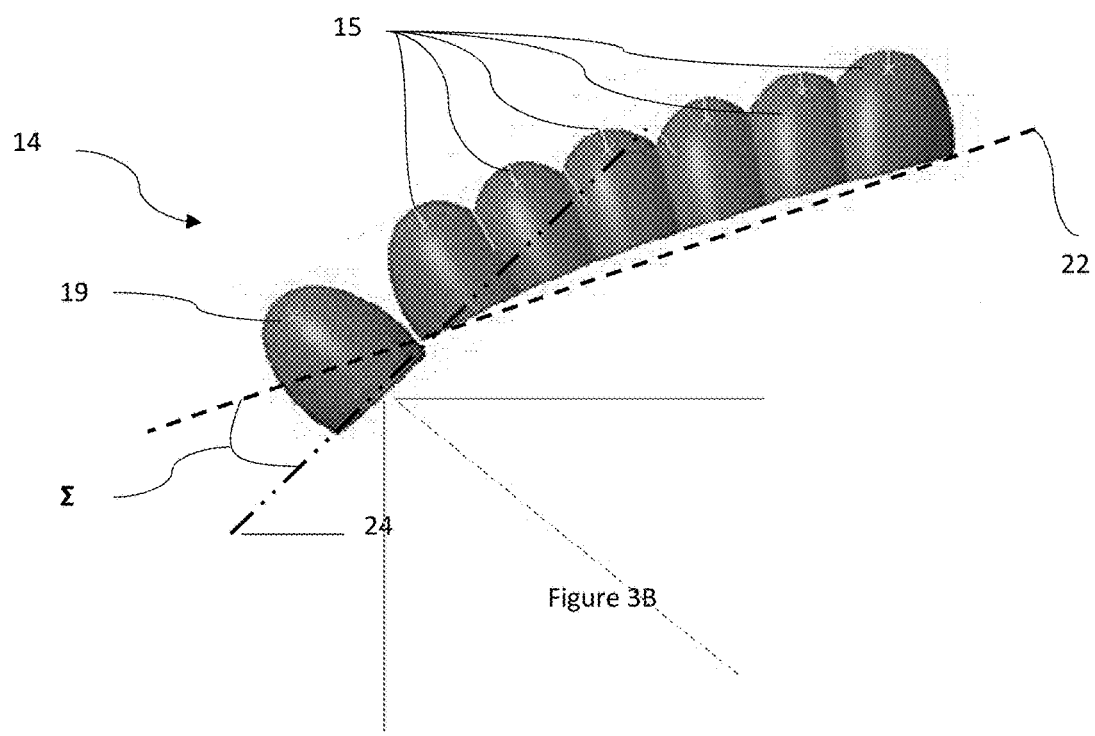
FIG. 3B illustrates positions of the primary reflectors relative to the static bending light reflectors.

FIG. 3B illustrates a plurality of reflectors 14 that include a primary reflector 15 and a static bending light reflector 19. The primary reflectors 15 extend along a primary reflector axis 22 and the static bending light reflector 19 extends along a static bending light reflector axis 24. The primary reflector axis 22 and the static bending light reflector axis 24 extend at an angle (Σ) relative to each other.

Figure 4A:
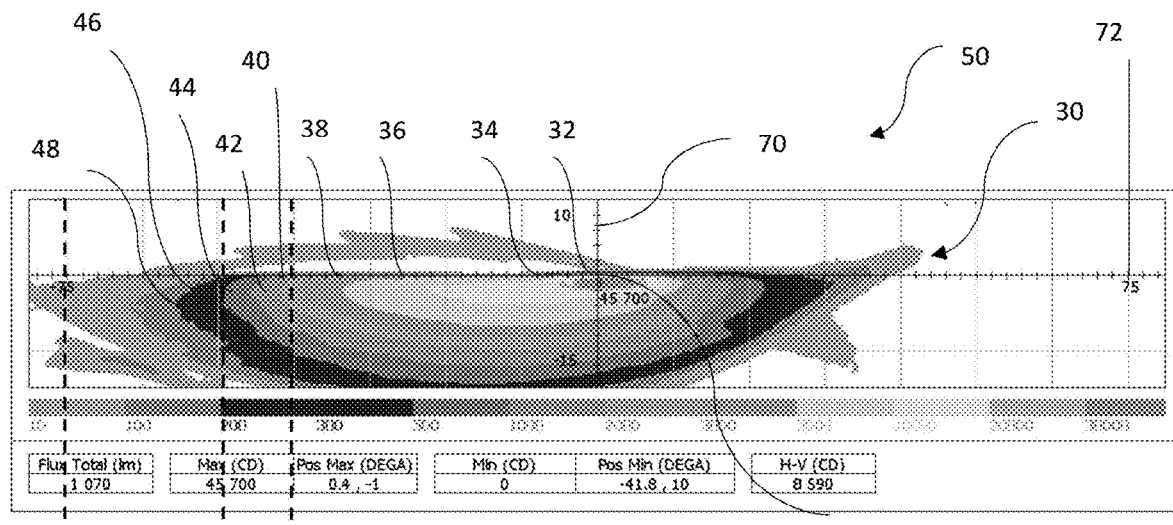
FIG. 4A is an isocandela illustrating the light pattern formed by the light system with the static bending light turned off.

FIG. 4A illustrates an isocandela 50 where a static bending light is turned off. The isocandela 50 has a vertical axis 70 and a horizontal axis 72 with light 30 plotted on the vertical axis 70 and the horizontal axis 72. A vehicle 2 is located at the intersection of the vertical axis 70 and the horizontal axis 72. The horizontal axis 72 is divided into segments of 10 degrees. The light 30 has a highest intensity 32 closest to the vehicle 2 and gradually decreases as the light is measured farther and farther from the vehicle 2. Thus, the light intensities 32-48 have the following intensity levels where 32>34>36>38>40>42>44>46>48. The light intensity 48 is then compared to an angle that the light 30 extends relative to the vehicle 2 to determine an angle that is illuminated relative to a vehicle 2. The light intensity 48 is about 200 lumens at around 45 degrees from the vehicle 2.

Figure 4B:
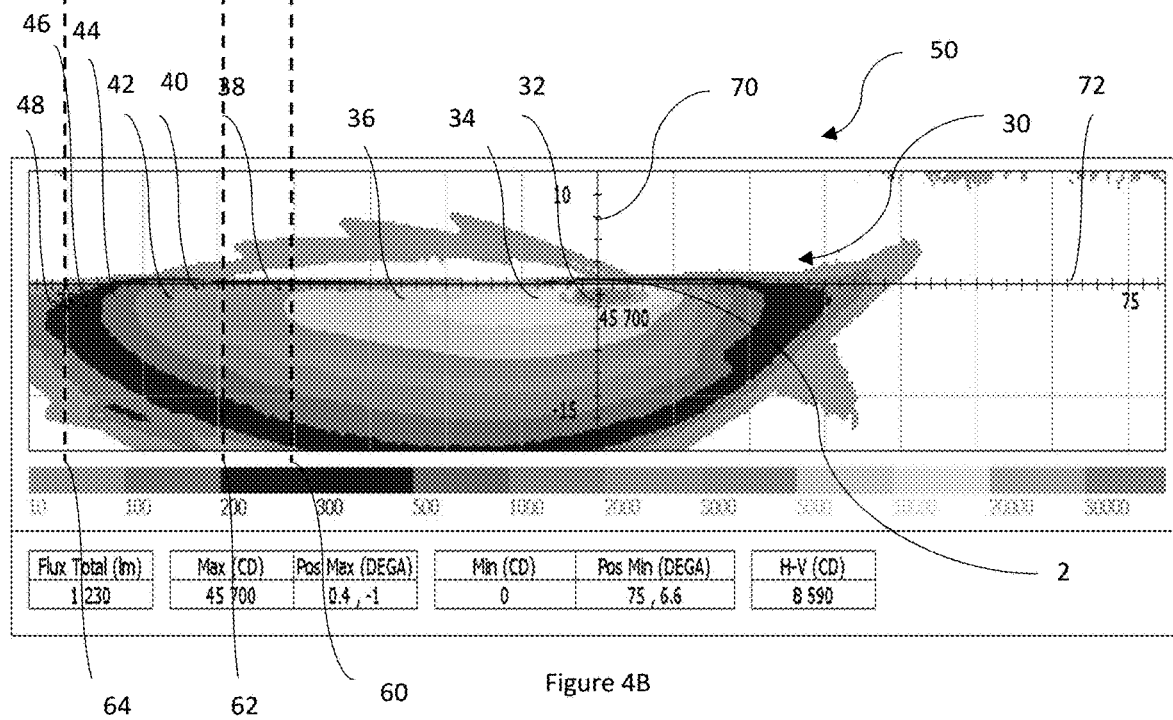

FIG. 4B illustrates an isocandela 50 where the static bending light is turned on. The isocandela 50 has a vertical axis 70 and a horizontal axis 72. A vehicle 2 is located at the intersection of the vertical axis 70 and the horizontal axis 72. The horizontal axis 72 is divided into segments of 10 degrees. The light 30 has a highest intensity 32 closest to the vehicle 2 and gradually decreases as the light is measured farther and farther from the vehicle 2. Thus, the light intensities 32-48 have the following intensity levels where 32>34>36>38>40>42>44>46>48. The light intensity 48 is then compared to an angle that the light 30 extends relative to the vehicle 2 to determine an angle that is illuminated relative to a vehicle 2. The light intensity 48 is about 200 lumens at 70 degrees. As shown, the static bending light extends the light 36 to 40 degrees from the vehicle, the light 40 beyond 50 degrees, and the light 48 beyond 70 degrees.

Figure 5:
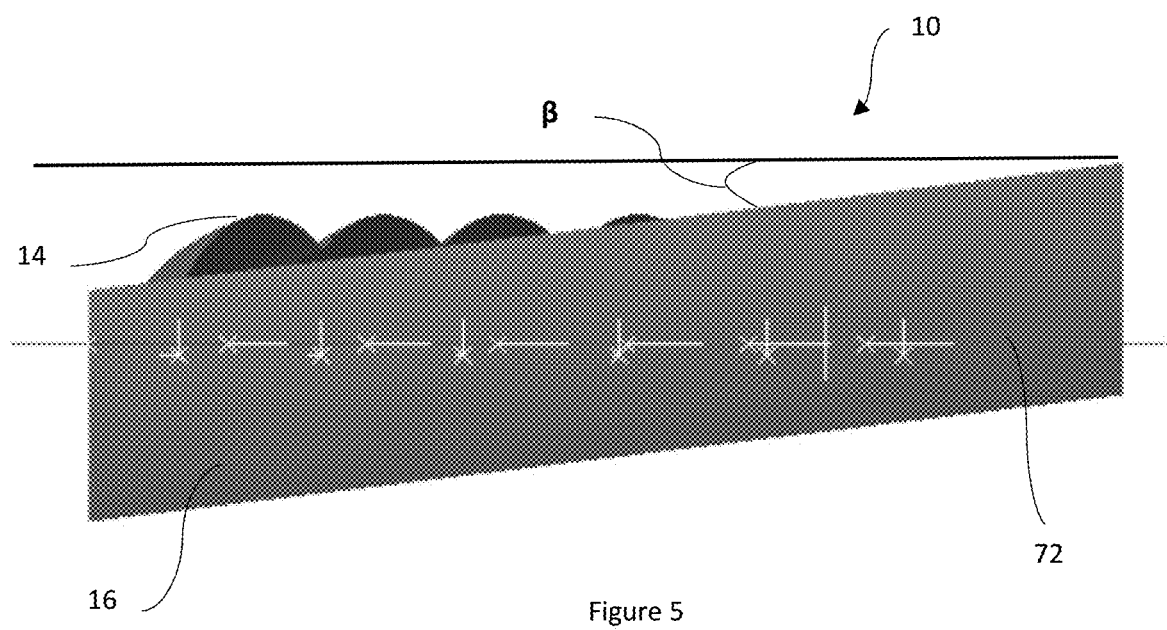
FIG. 5 illustrates the light system with the lens angled relative to the reflector.

FIG. 5 illustrates an angular relationship between a reflector 14 and a lens 16 of the light system 10. The primary lens 16 has a horizontal axis 72 and the primary lens 16 extends at an angle relative to the horizontal axis 72. The reflector 14 extends parallel to the horizontal axis 72. The primary lens 16 extends at an angle (β) relative to the reflector 14.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
10 Light System
12 Light Source
14 Reflector
16 Primary Lens
18 Static Bending Light
20 Direction of Movement
30 Light
32 Light Intensity
34 Light Intensity
36 Light Intensity
38 Light Intensity
40 Light Intensity
42 Light Intensity
44 Light Intensity
46 Light Intensity
48 Light Intensity
50 Isocandela
52 Direct light
54 Reflected light
56 Reflected Bending Light
60 40 degrees
62 50 degrees
64 70 degrees
70 Vertical Axis
72 Horizontal axis
80 Reflected Direction Region
82 Static Bending Light Direction Region
90 Longitudinal Axis

I claim:
1. A light system comprising:
 a) a plurality of light sources configured to be located on a vehicle and one or more of the plurality of light sources configured to generate light that is projected outboard of a width of a vehicle;
 b) one or more reflectors that are angled in a first direction relative to the plurality of light sources; and
 c) one or more static bending light reflectors that are angled in a second direction relative to the plurality of light sources and the one or more reflectors so that light from the one or more static bending light reflectors are projected outboard of the width of the vehicle; and
 d) a primary lens that extends over all of the plurality of light sources, and the primary lens has a first end and a second end with a longitudinal axis extending between the first end and the second end and the primary lens extends from the first end to the second end at an angle of about 5 degrees or more to about 30 degrees or less relative to the longitudinal axis of the primary lens when viewed along an optical axis of the plurality of light sources.
2. The light system of claim 1, wherein the one or more reflectors reflect light in a reflected direction region and the one or more static bending light reflectors reflect light in a static bending light direction region that is at an angle relative to and different from the reflected direction region.
3. The light system of claim 1, wherein the one or more reflectors are a plurality of reflectors that are located side by side and each of the plurality of reflectors have an opening that is generally coplanar to direct light in a same direction.

4. The light system of claim 3, wherein the one or more static bending light reflectors have an opening that is located at an angle relative to the plurality of reflectors.

5. The light system of claim 4, wherein the angle of the static bending light reflectors relative to the plurality of reflectors is about 5 degrees or more and about 15 degrees or less.

6. The light system of claim 1, wherein a reflected direction region from light reflected by the one or more reflectors spans a region directly in front of the vehicle along a longitudinal axis of the vehicle to about 40 degrees or less from the longitudinal axis.

7. The light system of claim 6, wherein a static bending light direction region from light reflected by the one or more static bending light reflectors spans a second region from about 40 degrees or more from the longitudinal axis to about 90 degrees from the longitudinal axis.

8. The light system of claim 7, wherein light from the static bending light reflector has an intensity of about 200 lumens at an angle of about 75 degrees from the longitudinal axis.

9. The light system of claim 1, wherein the region in which light reflected from the one or more static bending light reflectors is projected outboard of the width of the vehicle extends from about a 40-degree angle to about an 80 degree angle from a longitudinal axis of the vehicle.

10. The light system of claim 1, wherein an external lens extends over the primary lens.

11. The light system of claim 10, wherein the primary lens is one primary lens.

12. The light system of claim 1, wherein the one or more reflectors extend substantially parallel to the longitudinal axis of the primary lens.

13. The light system of claim 1, wherein a reflected direction region from light reflected by the one or more reflectors includes a portion that is substantially normal to the primary lens.

14. The light system of claim 13, wherein the reflected direction region is an angle of about 65 degrees to about 90 degrees relative to the primary lens.

15. The light system of claim 11, wherein a static bending light direction region from light reflected by the one or more static bending light reflectors spans an angle of about 15 degrees or more and about 75 degrees or less relative to the primary lens.

16. The light system of claim 1, wherein the light system includes a static bending light that includes the one or more static bending light reflectors.

17. A light system comprising:
a) a primary lens within a vehicle;
b) a plurality of light sources configured to be located on the vehicle and one or more of the plurality of light sources configured to generate light that is projected outboard of a width of a vehicle;
c) one or more reflectors that are angled in a first direction relative to the plurality of light sources so that light extends from the one or more light reflectors through the primary lens in a reflected direction region; and
d) one or more static bending light reflectors that are angled in a second direction relative to the plurality of light sources and the one or more reflectors so that light is reflected through the primary lens in a static bending light direction region that is different from the reflected direction region; and
wherein the primary lens is a single primary lens that extends over all of the plurality of light sources, and the single primary lens has a top edge, a first end, a second end, and a longitudinal axis extending between the first end and the second end, and the top edge of the single primary lens extends from the first end to the second end at an angle of about 5 degrees or more to about 30 degrees or less relative to the longitudinal axis of the single primary lens.

18. The light system of claim 17, wherein the reflected direction region and the static bending light direction region partially overlap.

19. The light system of claim 18, wherein the reflected direction region extends from a longitudinal axis of the vehicle to about 50 degrees or less relative to the longitudinal axis and the static bending light direction region extends from about 30 degrees to about 75 degrees or less relative to the longitudinal axis of the vehicle.

20. The light system of claim 18, wherein a forward end of the one or more static bending light reflectors is located out of plane and at an angle relative to the one or more reflectors.

* * * * *

UNITED STATES PATENT AND TRADEMARK OFFICE
CERTIFICATE OF CORRECTION

| | | |
|---|---|---|
| PATENT NO. | : 11,287,100 B2 | |
| APPLICATION NO. | : 17/006053 | |
| DATED | : March 29, 2022 | |
| INVENTOR(S) | : Potter | |

It is certified that error appears in the above-identified patent and that said Letters Patent is hereby corrected as shown below:

In the Claims

At Column 11, Claim number 15, Line number 44, change "11" to --1--.

Signed and Sealed this
Seventeenth Day of May, 2022

*Katherine Kelly Vidal*

Katherine Kelly Vidal
*Director of the United States Patent and Trademark Office*